United States Patent
Purohit (10) Patent No.: US 9,491,196 B2
(45) Date of Patent: Nov. 8, 2016

(54) SECURITY FOR GROUP ADDRESSED DATA PACKETS IN WIRELESS NETWORKS

(71) Applicant: Sibasis Purohit, Bangalore (IN)

(72) Inventor: Sibasis Purohit, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 0 days.

(21) Appl. No.: 14/487,130

(22) Filed: Sep. 16, 2014

(65) Prior Publication Data

US 2016/0080416 A1 Mar. 17, 2016

(51) Int. Cl.
*H04L 29/06* (2006.01)
*H04W 12/04* (2009.01)
*H04L 12/18* (2006.01)

(52) U.S. Cl.
CPC ............ *H04L 63/162* (2013.01); *H04L 12/18* (2013.01); *H04L 12/189* (2013.01); *H04L 63/0464* (2013.01); *H04L 63/065* (2013.01); *H04L 63/164* (2013.01); *H04W 12/04* (2013.01)

(58) Field of Classification Search
CPC . H04L 63/0428; H04L 63/166; H04L 63/08; H04L 63/0823; H04L 63/164
USPC .......................................................... 713/151
See application file for complete search history.

(56) References Cited

U.S. PATENT DOCUMENTS

| | | | |
|---|---|---|---|
| 8,447,978 B2 | 5/2013 | Shiba | |
| 8,473,736 B2 | 6/2013 | Gamer et al. | |
| 8,526,604 B2 | 9/2013 | Batra et al. | |
| 8,555,344 B1 | 10/2013 | Wiedmann et al. | |
| 2003/0161474 A1* | 8/2003 | Matsuzaki | H04L 9/0836 380/277 |
| 2005/0036502 A1* | 2/2005 | Blanc | H04L 49/201 370/412 |
| 2005/0223229 A1* | 10/2005 | Roeder | H04L 63/061 713/171 |
| 2006/0198368 A1* | 9/2006 | Guichard | H04L 12/4641 370/389 |
| 2007/0195761 A1* | 8/2007 | Tatar | H04L 49/1546 370/389 |

(Continued)

FOREIGN PATENT DOCUMENTS

WO 2009082356 A1 7/2009
WO 2013120225 A1 8/2013

OTHER PUBLICATIONS

WPA Group Rekey Interval, "http://www.ehow.com/facts_7908705_wpa-group-rekey-interval.html", downloaded circa, Feb. 28, 2014, pp. 1-4.

(Continued)

*Primary Examiner* — Farid Homayounmehr
*Assistant Examiner* — Sanchit Sarker
(74) *Attorney, Agent, or Firm* — Iphorizons PLLC; Narendra Reddy Thappeta (57) ABSTRACT

A wireless network includes a border router, multiple router nodes and end devices. All nodes of the wireless network use a same group key for encryption and decryption of payloads of multicast layer-2 packets. A router node of the wireless network receives a group key from its parent node, and forwards the group key to its child nodes. The router node receives a layer-2 multicast packet with a payload specifying a multicast layer-3 address. The router node decrypts the payload using the group key. If at least one child node of the router node belongs to a group corresponding to the multicast layer-3 address, the router node forwards the encrypted payload as a layer-2 multicast packet to corresponding child nodes. Use of a same group key across all nodes of the wireless network reduces storage space in a node for storing group keys, and also simplifies group key handling.

20 Claims, 8 Drawing Sheets

(56) References Cited

U.S. PATENT DOCUMENTS

| | | | | |
|---|---|---|---|---|
| 2009/0292914 | A1* | 11/2009 | Liu | H04L 9/0836 713/153 |
| 2010/0250930 | A1* | 9/2010 | Csaszar | H04L 29/12066 713/168 |
| 2010/0260146 | A1* | 10/2010 | Lu | H04L 12/4633 370/331 |
| 2010/0329463 | A1 | 12/2010 | Ratliff et al. | |
| 2011/0122804 | A1* | 5/2011 | Iyer | H04L 12/189 370/311 |
| 2011/0153862 | A1* | 6/2011 | Roosta | H04L 45/00 709/234 |
| 2011/0255695 | A1* | 10/2011 | Lindholm | H04L 9/0833 380/278 |
| 2012/0051546 | A1* | 3/2012 | Tsurumoto | H04L 9/0637 380/270 |
| 2012/0236857 | A1* | 9/2012 | Manzella | H04L 49/201 370/390 |
| 2012/0243683 | A1* | 9/2012 | Oba | H04L 9/0836 380/255 |
| 2012/0257756 | A1* | 10/2012 | Huang | H04L 9/0836 380/281 |
| 2012/0266217 | A1 | 10/2012 | Kaal et al. | |
| 2013/0094484 | A1* | 4/2013 | Kneckt | H04W 4/02 370/338 |
| 2013/0272164 | A1 | 10/2013 | Leonardos et al. | |
| 2013/0294436 | A1* | 11/2013 | Kim | H04W 16/14 370/338 |
| 2014/0334383 | A1* | 11/2014 | Sakemi | H04W 12/10 370/328 |
| 2015/0201323 | A1* | 7/2015 | Tjahjono | H04W 8/186 370/312 |
| 2015/0312820 | A1* | 10/2015 | Yang | H04W 36/023 370/331 |
| 2015/0372928 | A1* | 12/2015 | Basilier | H04L 12/4633 370/235 |
| 2016/0080416 | A1* | 3/2016 | Purohit | H04L 12/189 713/151 |

OTHER PUBLICATIONS

WPA and WPA2, "http://www.maxi-pedia.com/WPA+WPA2+WiFi+protected+access", downloaded circa, Feb. 28, 2014, pp. 1-4.

General WLAN Screen, "ftp://ftp.zyxel.com.tr/Utility/ZyXEL/h_WLAN_General.html", downloaded circa, Feb. 28, 2014, pp. 1-3.

Cisco: Configuring Cipher Suites and WEP, "http://www.cisco.com/c/en/us/td/docs/wireless/access_point/12-3_8_JA/configuration/guide/1238jasc/s38wep.html", downloaded circa, Feb. 28, 2014, pp. 1-4.

IEEE: Secure Authentication Protocols for WLAN "http://ieeexplore.ieee.org/xpl/articleDetails.jsp?tp=&arnumber=5370889&matchBoolean%3Dtrue%26searchField%3DSearch_All%26queryText%3D%28%28%28single%29+AND+WPA+2%29+AND+group+key%29", downloaded circa, Feb. 28, 2014, pp. 1-2.

etutorials.org: Key Management, "http://etutorials.org/Networking/Wireless+lan+security/Chapter+8.+WLAN+Encryption+and+Data+Integrity+Protocols/Key+Management/", downloaded circa, Apr. 22, 2015, pp. 1-5.

Network Working Group: Transmission of IPv6 Packets over Ethernet Networks, hhttp://tools.ietf.org/html/rfc2464, downloaded circa, Apr. 22, 2015, pp. 1-7.

Internet Engineering Task Force (IETF); Address Mapping of IPv6 Multicast Packets on Ethernet, "https://tools.ietf.org/html/rfc6085", downloaded circa, Apr. 22, 2015, pp. 1-3.

Cisco; 802.11 Association process explained, "https://kb.meraki.com/knowledge_base/80211-association-process-explained", downloaded circa, Apr. 22, 2015, pp. 1-2.

Davin Akin: Planet3 Wireless, Inc., 802.11i Authentication and Key Management (AKM), date May 2005, pp. 1-10.

Changhua He, John C Mitchell: Electrical Engineering and Computer Science Departments, Analysis of the 802.11i 4-Way Handshake, Copyright 2004, pp. 1-8.

* cited by examiner

SECURITY FOR GROUP ADDRESSED DATA PACKETS IN WIRELESS NETWORKS

BACKGROUND

1. Technical Field

Embodiments of the present disclosure relate generally to wireless networks, and more specifically to security for group addressed data packets in wireless networks.

2. Related Art

Wireless networks as used herein refer to networks such as those operating in accordance with IEEE 802.11 family of standards in terms of frequency bands of operation, modulation techniques, etc., and operate to provide connectivity in the range of few tens of meters. A typical wireless network enables end devices to exchange data packets. Wireless network typically contain aggregators such as access points (AP) or router nodes, which forward a packet received from (and generated by) a source (end) system to a destination (end) system.

Group addressed data packets refer to packets which are directed to multiple devices of a wireless network. The specific end devices which are intended recipients may be specified by multicast addresses, with each multicast address designed for identifying a corresponding subset of devices of those present on the wireless network. These multicast addresses can be at layer-2 (corresponding to the wireless medium) or at higher layers (e.g., Internet Protocol (IP) level).

There is a general need to provide security for group addressed data packets (or multicast packets). Security implies appropriate encryption/decryption, such that the packet content cannot be viewed and/or tampered with, as suited in the corresponding environments.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, all nodes of a wireless network that includes a border router, multiple router nodes and end devices, use a same group key for encryption and decryption of payloads of multicast layer-2 packets. A router node of the wireless network receives a group key from its parent node, and forwards the group key to its child nodes. The router node receives a layer-2 multicast packet with an encrypted payload, the payload containing a layer-3 packet specifying a multicast address. The router node decrypts the payload using the group key received from its parent node. If the router node determines that at least one of its child nodes belongs to a group corresponding to the multicast address, the router node forwards the encrypted payload as a layer-2 multicast packet to corresponding child nodes. The corresponding child nodes use the same group key as used in the parent router node to decrypt and process the payload. Use of a same group key across all nodes of the wireless network reduces storage space in a node for storing group keys, and also processing overhead needed to determine and distribute group keys.

According to another aspect of the present disclosure, the border router generates a new group key at a later time instant (later than the time point at which the group key was generated for the first time), and causes the new group key to be forwarded to all other nodes the wireless network, the new group key being thereafter operative in all of the nodes of the wireless network to encrypt and decrypt payloads of multicast layer-2 packets.

According to yet another aspect of the present disclosure, the border router generates a new passphrase along with the new group key, and both the new group key and the new passphrase are forwarded to all nodes of the wireless network. The use of new passphrases may prevent a guest node provided temporary access to the wireless network from being able to access to the network after the membership expires.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
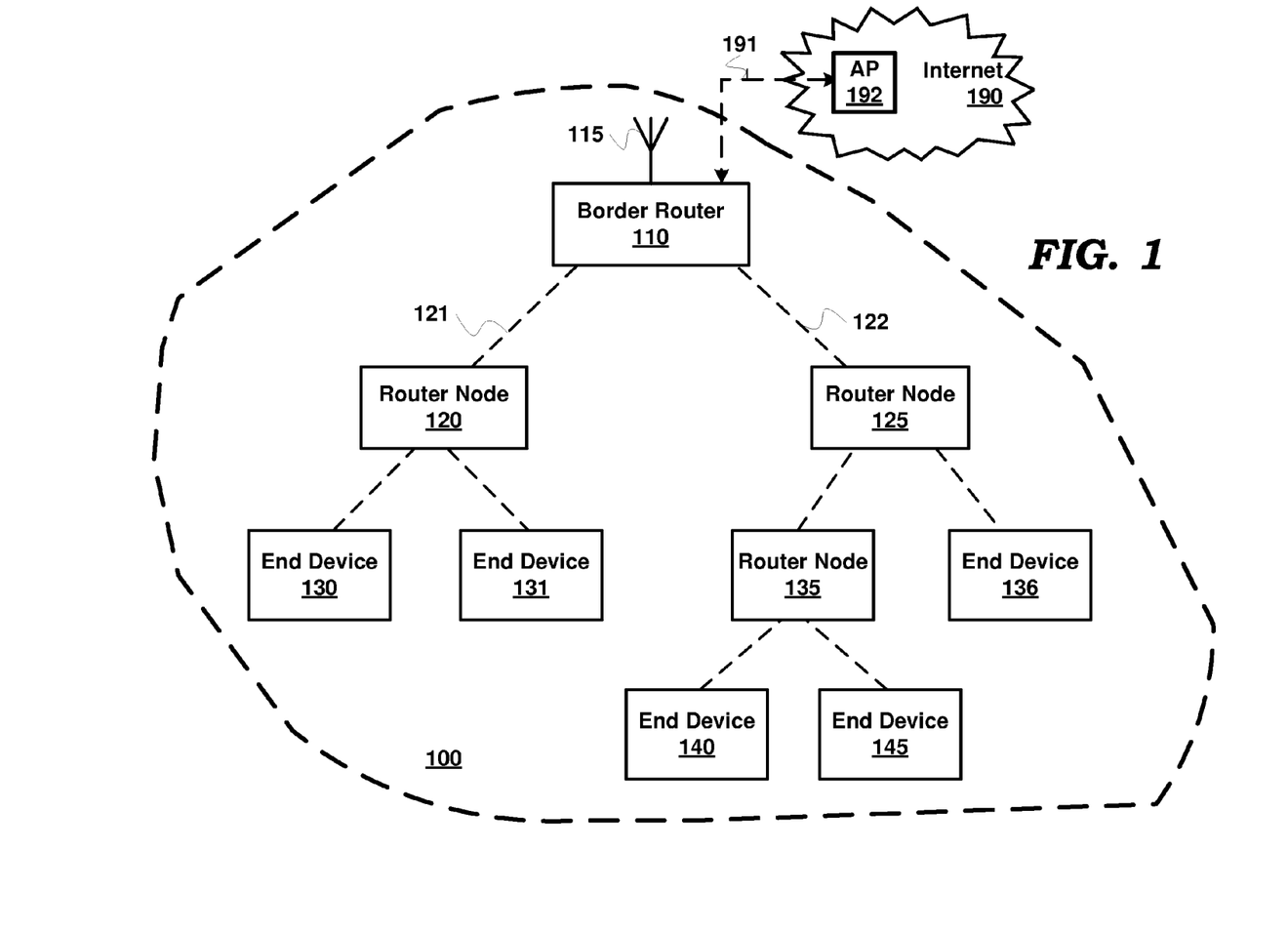
FIG. 1 is a diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems. FIG. 1 is shown containing border router 110, router nodes 120, 125 and 135, and end devices 130, 131, 136, 140 and 145, and internet 190.

Internet 190 extends the connectivity of end devices of FIG. 1 to various systems/devices (not shown) in internet 190. Internet 190 may be implemented using protocols such as Internet Protocol (IP). In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across a wireless network (described below).

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Border router 110 (shown connected to AP 192 of internet 190 by a wireless path 191), router nodes 120, 125 and 135, and end devices 130, 131, 136, 140 and 145 together represent a wireless network, referred to herein as wireless network 100. In an embodiment, each device/system of wireless network 100 of FIG. 1 operates in accordance with IEEE 802.11 family of standards in terms of frequency bands of operation, modulation techniques, etc. Thus each device may be designed to be operable as a wireless station (STA) and/or an access point (AP) as defined by the IEEE 802.11 standards, although some modifications/enhancements to the IEEE 802.11 standards may be present, as noted below.

Wireless network 100 containing border router (or root node) 110, router nodes 120, 125 and 135, and end devices 130, 131, 136, 140 and 145, including the associated hierarchy shown in FIG. 1, may be formed using one of several known techniques, one of which is according to the RPL protocol described in RFC 6550 published by the Internet Engineering Task Force (IETF). The manner in which wireless network 100 may be formed using the RPL protocol in some example embodiments, is described in detail in co-pending U.S. patent application Ser. No. 14/453,634, entitled "LAYER-3 MESH CONNECTIVITY OF WIRELESS LOCAL NETWORKS", which is incorporated herein in its entirety.

The formation of wireless network 100 according to RPL is noted merely by way of example, and wireless network 100 can be formed or be designed to operate according to other technologies and standards as well. For example, wireless network 100 of FIG. 1 may be designed according to IEEE 802.15.4 standard, which specifies the physical layer and media access control for low-rate wireless personal area networks (LR-WPANs). In general, the features of the present disclosure can be implemented in any type of wireless network employing security at the layer-2 level for layer-3 payloads specifying layer-3 multicast addresses.

It is assumed herein that node 110 operates as a border router, nodes 120, 125 and 135 operate as router nodes, and nodes 130, 131, 135, 136, 140 and 145 operate as end devices as shown, for example due to respective configuration settings by an administrator. However, in general, any node can be configured as a router or an end device, based on considerations such as, for example, specific geographical layout of the nodes, proximity to other router nodes, etc. Further, each of the nodes of wireless network 100 is designed to be RPL-capable, and thus can co-operatively form wireless network 100.

In FIG. 1, the child-parent relationship of nodes is indicated by non-directional dashed lines, border router 110 representing the root of wireless network 100. Thus, dashed line 121 indicates that router node 120 is a child node of border router 110. Similarly, dashed line 122 indicates that router node 125 is a child node of border router 110.

Once wireless network 100 is formed as described above, the nodes of wireless network 100 may exchange data packets with one another and/or with devices in internet 190. One example type of packet that may be exchanged is a layer-2 packet containing a group-addressed layer-3 (IP) packet in a payload portion of the layer-2 packet. In one embodiment, each end device subscribes to corresponding IP multi-cast addresses of interest, and only such subscribing devices are considered members of the multicast group identified by the corresponding multicast address. Each router node 120, 125 and 135 may accordingly maintain information indicating whether there is at least one member of corresponding IP multicast group in the downward direction (i.e., towards the end devices).

Thus, when a layer-2 packet with encrypted payload is transmitted towards end devices, each router node in the path and the destination end devices may require keys for decryption of the packet and for any required additional processing. For example, each router node 120/125/135 may examine the multicast IP address in payload to determine whether or not to forward the packet in the downward direction (i.e., towards the corresponding end devices). The end devices may examine the multicast IP address in the payload to determine whether the packet is to be further processed (i.e., if the device is a member of the multicast group) or discarded.

However, it may be appreciated that keys are required for each hop to ensure the payload is securely transmitted. As is also well known, group keys are used for secure transmission of multicast packets. The manner in which such group keys are distributed and used in nodes of wireless network 100, according to aspects of the present disclosure, is described next with respect to a flowchart.

3. Group Keys

Figure 2:
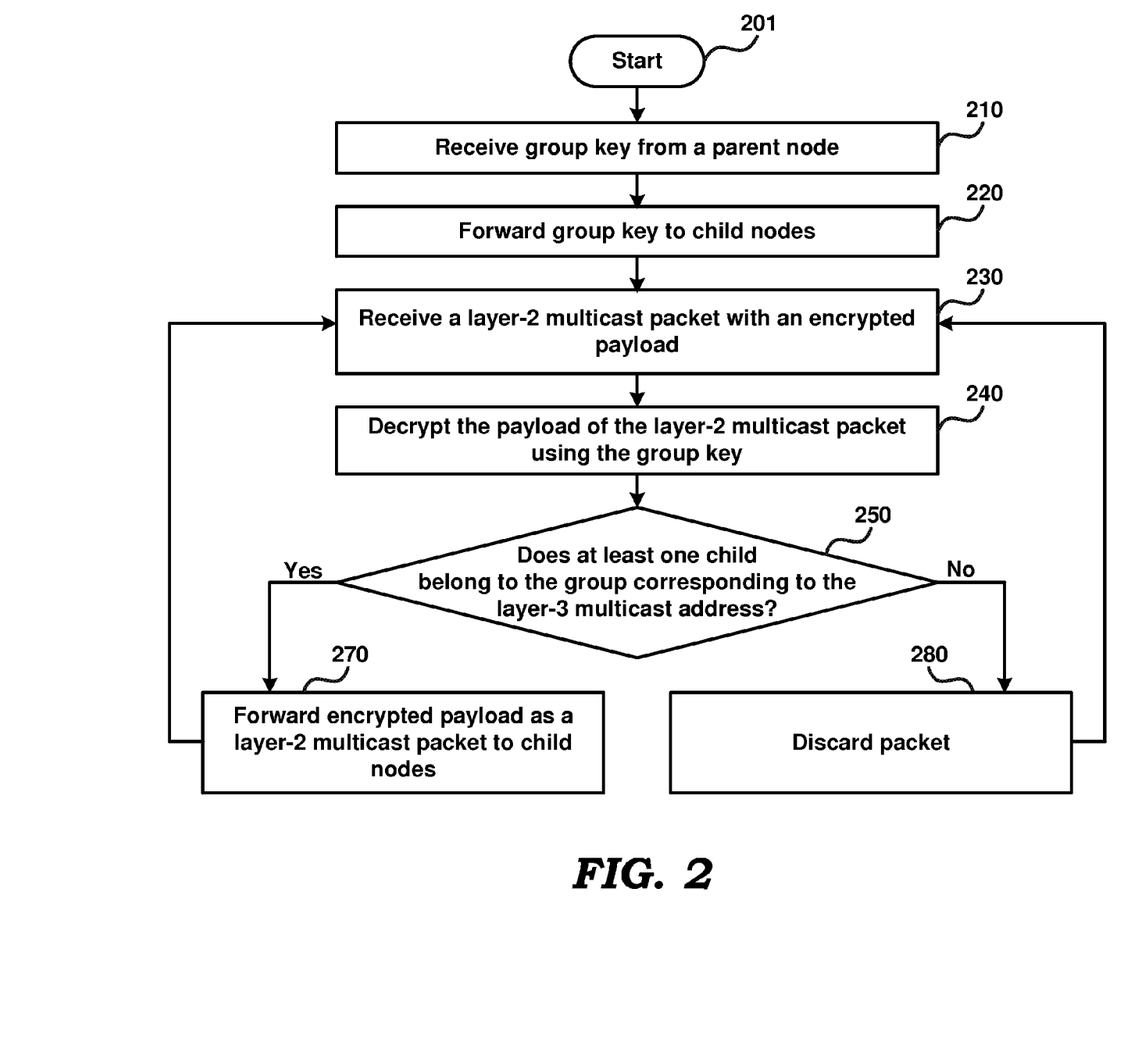
FIG. 2 is a flow chart illustrating the manner in which group keys are used, in an embodiment of the present disclosure.

FIG. 2 is a flow chart illustrating the manner in which group keys are distributed and used in an embodiment of the present disclosure. The flowchart is described below with respect to router node 120 of FIG. 1, and the environment of FIG. 1 in general, merely for illustration. However, the features can be implemented in the other nodes of FIG. 1, as well as other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, router node 120 receives a group key from its parent node. As is well known in the relevant arts, a group key (GTK in the 802.11 context and corresponding parlance) is used for encryption and later decryption of the payload of a layer-2 multicast packet. In the example of FIG. 1, border router 110 is the parent node of router node 120 and accordingly the group key is received from border router 110. The group key may be received upon router node 120 joining the IP network in the hierarchy under border router 110 or as the group key is updated at any later desired intervals (periodic or random interval). Control then passes to step 220.

In step 220, router node 120 forwards the group key to child nodes. The group key may be forwarded as updates are received, or as the child node attempts to form the group key by communicating with the parent in accordance with WPA or WPA2. In the example of FIG. 1, end devices 130 and 131 are child nodes of router node 120. Router node 120, thus, forwards the group key to one or both of end devices 130 and 131. Control then passes to step 230.

In step 230, router node 120 receives a layer-2 multicast data packet with an encrypted payload. The payload contains a layer-3/IP packet. Control then passes to step 240.

In step 240, router node 120 decrypts the payload of the layer-2 packet using the group key. On decryption of the payload, the entire IP packet, including destination IP address, is available to router node 120 for inspection. It is assumed that the destination IP address uniquely specifies the multicast group, for example, as in IPv6 protocol. Control then passes to step 250.

In step 250, router node 120 determines if at least one child node (of step 220) belongs to the group corresponding to the layer-3 multicast destination address. If there is at least one child node in the group, control passes to step 270. If no child node belongs to the group (i.e., not having any end devices which have subscribed to the IP multicast address), control passes to step 280.

In step 270, router node 120 encrypts the layer-3 packet (with any requisite changes made to the decrypted payload) and forwards the encrypted payload as a layer-2 multicast to child nodes. In general, the packet is received by either other router nodes (which are child nodes at lower levels under border router 110) or end devices. In case another router node receives the packet, the flowchart of FIG. 2 is performed again for the received packet. Control then passes to step 230, and the corresponding steps may be repeated.

In step 280, router node 120 discards the packet, i.e., does not further process the packet. Control then passes to step 230, and the corresponding steps may be repeated for the next received multicast packet.

If at least one child node is a member of the group corresponding to the layer-3 multicast address, the child node would receive the layer-2 multicast packet (of step 270), and decrypt the encrypted payload of the layer-2 multicast packet using the group key it received as a result of the operation of step 220. On decrypting the encrypted payload of the layer-2 multicast packet, the child node would obtain the payload portion of the layer-3 packet itself, and process the layer-3 payload suitably.

In the manner similar to that described above with respect to the flowchart of FIG. 2, all nodes (router nodes and end devices) of wireless network 100 obtain the (same) group key, and use the group key to encrypt and decrypt payloads of layer-2 packets. Since all nodes of wireless network 100 uses the same (single) group key, storage requirements for storing group keys in each node is reduced. Further, the processing overhead needed to determine and distribute group keys is also reduced, since only a single group key is used for the whole of wireless network 100.

The manner in which steps 210 and 220 of the flowchart of FIG. 2 are performed in router node 120 is described in sections below. Operations performed by the various protocol stack layers in router node 120 in performing steps 230, 240, 250, 270 and 280 of the flowchart of FIG. 2 are illustrated below with respect to FIG. 4. The format of a layer-2 packet received and processed by router node 120 is however described first.

4. Packet Format

Figure 5A:
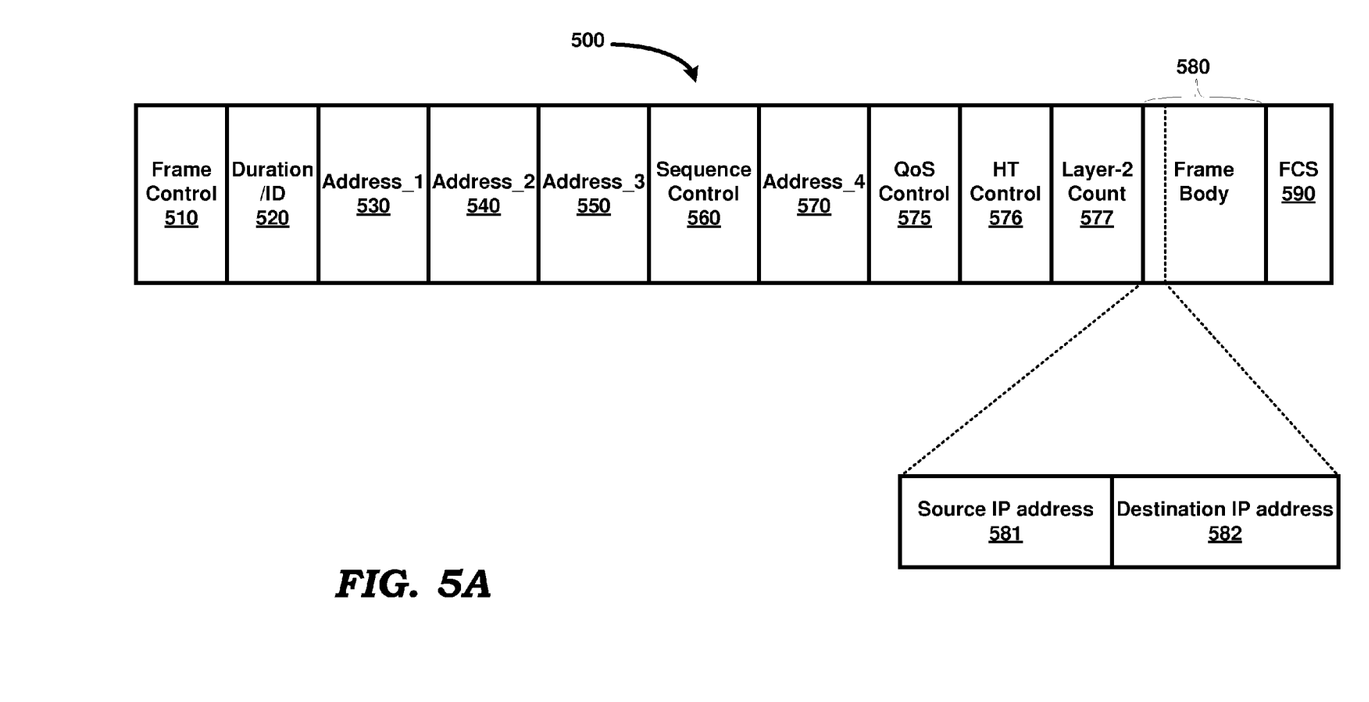
FIG. 5A is a diagram of a wireless packet in an embodiment of the present disclosure.

FIG. 5A shows the format of a wireless packet 500 (a layer-2 packet) in an embodiment of the present disclosure. The format of wireless packet is in accordance with 802.11 standards, and is shown containing fields Frame Control 510, Duration/ID 520, Address_1 530, Address_2 540, Address_3 550, Sequence Control 560, Address_4 570, QoS Control 575, HT control 576, Layer-2 count 577, Frame Body 580 and FCS 590. Frame body 580 represents the payload portion of packet 500, and contains a layer-3 packet. Source IP address 581 and Destination IP address 582 respectively represent the IP addresses of the layer-3 source/originator of packet 500 and destination/consumer of packet 500. Frame body 580 additionally contains the payload (data) sought to be transmitted in the IP packet. A detailed description of the fields of packet 500 is provided in Section 8 of the IEEE Std 802.11-2012 document available with the International Telecommunications Union (ITU). Only those fields as relevant to this disclosure are described herein. It is also noted that, in practice, wireless packet 500 may contain more or fewer fields or proprietary modifications depending on the specific deployment environment.

Layer-2 count 577 contains a count value that a node transmitting packet 500 maintains locally (in a counter internally in the node), and represents the number of packets (irrespective of whether the packets are multicast or unicast, and including the current packet 500) that the node has transmitted thus far irrespective of the destination node for the packets. The transmitting node maintains a local record of the current value of the layer-2 count 577 in a (single) 'transmit counter'. Thus for example, at a time instant t0, router node 135 may transmit a unicast packet to end device 140, with the value of layer-2 count 577 equal to one in the packet. At a time instant t1 later than t0, router node 135 may transmit another unicast packet to end device 145, with the value of layer-2 count 577 equal to two in the packet, the transmit counter having been updated to a value two. At a time instant t2 later than t1, router node 135 may transmit another unicast packet to router node 125, with the value of layer-2 count 577 equal to three in the packet. At a time instant t3 later than t2, router node 135 may transmit a multicast packet to multicast group containing to end devices 140 and 145 and router node 125, with the value of layer-2 count 577 equal to four in the packet (the transmit counter having been updated to a value four), and so on.

Each node also maintains locally a record of the number of packets received from each neighbor/associated node in a separate 'receive counter'. Thus, if a node has N neighbors, the node would maintain N receive counters. Since end device 140 has only one neighbor node (router node 135), end device 140 would maintain one receive counter, storing therein the total number of packets that have been received from router node 135 thus far. In the example of above, after receipt of the multicast packet from router node 135, the value of the count stored by end device 140 in its receive counter would be four.

The use of the transmit and receive counters and the layer-2 count 577 field is designed to enable a node to detect replay attacks by rogue nodes, as is well known in the relevant arts. A receiving node such as end device 140 compares the value in the layer-2 count 577 field in a currently received packet from the transmitting node with the value in corresponding receive counter maintained at the receiving node for the transmitting node. Thus, in the above example, on receipt of the multicast packet from router node 135, end device 140 would compare the layer-2 count 577 in the packet (which is four) with the value (which would be three) in the receive counter, and further process the packet only if the value of layer-2 count 577 field is greater than the value in the receive counter. In the example, since the layer-2 count 577 is greater than the value in the receive counter, end device 140 would process the packet.

On the other hand, if at a time instant t5 later than t4, end device 140 receives a packet with value of layer-2 count 577 equal to one, end device 140 would discard the packet.

In an embodiment of the present disclosure, the payload (containing a layer-3 packet specifying a multicast address plus a layer-3 counter) of a layer-2 packet is encrypted using both the group key and the current value of the transmit counter in the transmitting node, the value in the transmitting counter also being the value of the layer-2 count 577 in the packet to be transmitted. The receiving node decrypts the payload using the layer-2 count value (i.e., contents of the Layer-2 count 577 field) and the group key. Thus, in such an embodiment, the layer-2 multicast packet of step 230 of FIG. 2 would contain the layer-2 count value, and the decryption of step 240 would be performed using both the group key (received in step 210) as well as the layer-2 count value 577 in the packet.

Figure 5B:
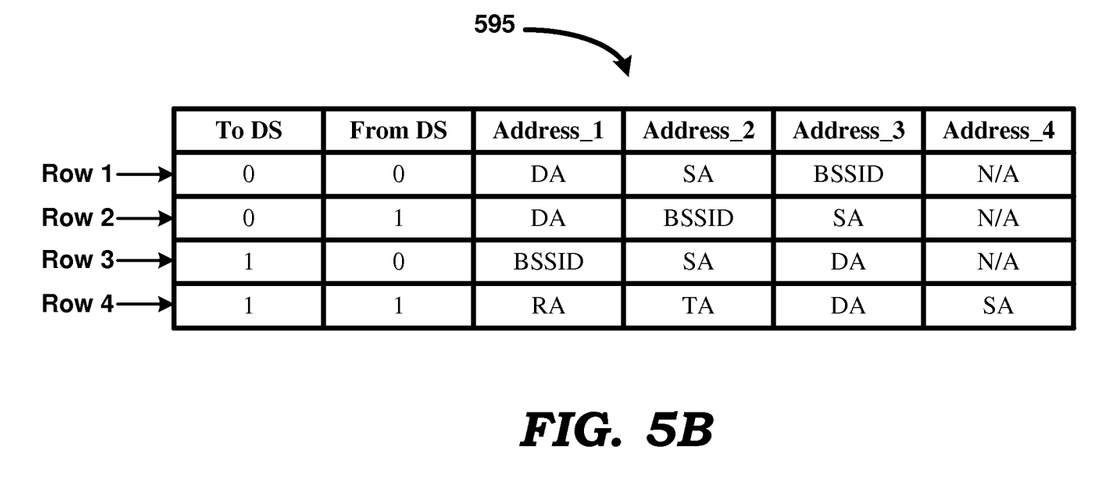
FIG. 5B is a table illustrating the correspondence between address fields and a pair of frame control bits in a packet according to IEEE 802.11 protocol.

Continuing with the description of FIG. 5A, Frame Control 510 internally contains several fields for specifying various frame control parameters such as protocol version, To DS, From DS, Power Management, etc. According to the IEEE 802.11 standards, a logic zero in each of the To DS and From DS fields signifies that the frame is being transmitted from one wireless station (STA) of an independent BSS (IBSS or ad hoc network) to another wireless station of the IBSS, or is a control or management frame. A logic one in each of the To DS and From DS fields signifies that the frame is being transferred from one AP to another AP in a wireless distribution system (WDS). A logic zero entry in the To DS field and a logic one entry in the From DS field signifies that the frame is being transmitted from an AP to a wireless station in an infrastructure BSS. A logic one entry in the To DS field and a logic zero entry in the From DS field signifies that the frame is being transmitted from a wireless station to the corresponding AP in an infrastructure BSS. Table 595 of FIG. 5B shows the correspondence between combinations of the To DS and From DS fields and address fields Address_1, Address_2, Address_3 and Address_4 according to the IEEE 802.11 protocol. The labels DA, SA and BSSID respectively denote the layer-2 destination address, layer-2 source address and Basic Service Set Identifier.

In embodiments of the present disclosure, the nodes of wireless network 100, being non-conventional devices, transmit data packets to a next hop node with the To DS and From DS fields each set to logic zero (as shown in Row 1 of FIG. 5B). Thus, assuming packet 500 is a unicast layer-2 packet with a unicast layer-3 packet in the payload, address_1 530 would contain the MAC (layer-2) address of the next hop device (layer-2 destination device). But, when the layer-3 packet in the payload of packet 500 is a multicast packet, the correspondence between the multicast layer-3 address and the destination layer-2 address (i.e., field Address_1 530) may be according to section 7 of RFC 2464. As described there, an IPv6 packet (layer-3 packet) with a multicast destination address (DST), consisting of the sixteen octets DST[1] through DST[16], is transmitted to the Ethernet (layer-2) multicast address whose first two octets are the value 3333 (hexadecimal), and whose last four octets are the last four octets of DST.

Irrespective of whether packet 500 is a unicast or multicast/broadcast packet, Address_2 540 would contain the MAC address of the current/transmitting device (and thus change with each hop). Address_3 550 would always contain the network ID of wireless network 100. The network ID of wireless mesh network may be configured manually by a user/administrator. Address_4 570 is not present, or if present, is not used. Whether packet 500 contains Address_4 570 or not may be set by the corresponding bit/bits in Frame control 510, per the IEEE 802.11 protocol. Source IP address 581 and destination IP address 582 would contain the IP addresses of the source and destination nodes according to conventional IP operation. When the layer-3 packet is a multicast packet, destination IP address 582 would contain the layer-3 multicast address.

Operations performed by the various protocol stack layers (communication stack) in router node 120 in performing steps 230, 240, 250, 270 and 280 of the flowchart of FIG. 2 are illustrated next. It is assumed in the following description that router node 120 has received a group key and forwarded the group key to its child nodes (in addition to storing the group key internally as well). It is further assumed in the description of FIG. 4 below that router node 120 receives (step 230) a layer-2 multicast packet from border router 110, processes the packet (steps 240 and 250) and forwards (step 270) the packet to end devices 130 and 131, which constitute the recipients of the multicast packet.

Figure 4:
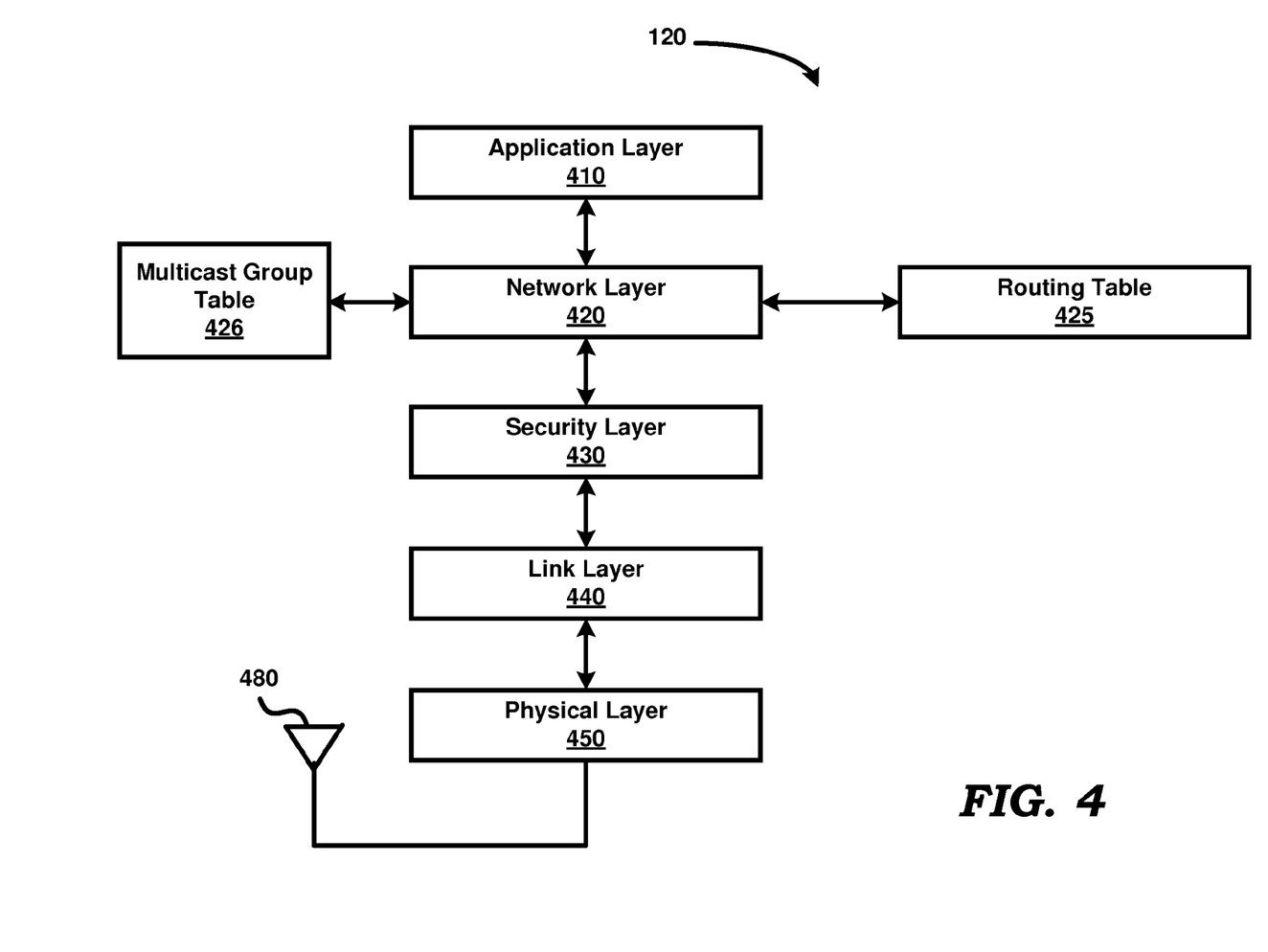
FIG. 4 is a block diagram showing the various communication layers in a node of a wireless network, in an embodiment of the present disclosure.

Referring to FIG. 4, router node 120 is shown there as containing antenna 480, physical layer 450, link layer 440, security layer 430, network layer 420 and application layer 410, each implemented as a corresponding module (realized by execution of software instructions by corresponding hardware elements).

Routing table 425, contains routing entries (in the manner described in co-pending U.S. patent application Ser. No. 14/453,634 referred above), and is available to network layer 420 for routing decisions. Routing table 420 may indicate the next hop MAC address for each IP network in the same subnet, and are thus used for routing unicast packets. With respect to multicast IP (destination) addresses, routing table 425 may include the IP addresses of any end nodes subscribing to the corresponding multicast group address. Alternatively, a separate table (Multicast Group Table 426) may be maintained to store the IP addresses of end nodes of each multicast group address. Tables 425 and 426 may be populated in a known way.

Corresponding to step 230, physical layer 450 receives, from border router 110, a wireless packet 500 (a layer-2 packet) from antenna 480. The received layer-2 packet contains an encrypted multicast layer-3 packet in its payload. Physical layer 450 forwards wireless packet 500 to security layer 430 via link layer 440.

Security layer 430 inspects the value of the Layer-2 count 577 field in the packet. If the value in the Layer-2 count 577 field is greater than the current value in the receive counter maintained in router node 120 which corresponds to border router 110, security layer 430 decrypts the payload of the packet received from link layer 440 using the group key and the value of the layer-count 577 field. Security layer 430 forwards the decrypted payload to network layer 420. The decryption may be performed in a known way. If the value in the Layer-2 count 577 field is not greater than the current value in the receive counter, security layer 430 may discard the packet.

Network layer 420 inspects the layer-3 multicast address in the destination IP address 582 of the packet, and determines from routing table 425 (or 426 if a separate table is maintained) the corresponding group of wireless devices (assumed to be end devices 130 and 131 in the example) to which the multicast layer-3 packet is to be forwarded. Such information is available to network layer 420, since nodes that form the destination group for the multicast address register would have registered with router node 120, as is well known in the relevant arts.

If the group thus determined contains a child node (to which router node 120 has earlier forwarded the group key), network layer 420 places (by overwriting prior address) the corresponding layer-2 multicast address in the Address_1 530 (destination address) of the received packet, and forwards the packet to security layer 430.

Security layer 430 encrypts the payload using the group key, places the current value of the transmit counter in the layer-2 count 577 field in the packet, and forwards the new layer-2 packet to link layer 440.

Link layer 440 places the MAC address of router node 120 in Address_2 540 of the new layer-2 packet, and forwards the new layer-2 packet to physical layer 450, which then transmits the new layer-2 packet on the wireless medium via antenna 480. However, if the child node is not part of the group no further processing may be performed by the layers 410-450 and the packet is simply dropped.

The manner in which a group key is generated and distributed to nodes of wireless network 100 in an embodiment of the present disclosure is described next.

4. Generation and Distribution of Group Keys

In an embodiment of the present disclosure, the group key to be used by nodes of wireless network 100 is generated by border router 110 based on a random number. Border router 110 encrypts the group key, and provides the encrypted group key to nodes at an immediately lower level in the hierarchy of wireless network 100 (router nodes 120 and 125 in the example of FIG. 1). Each of router nodes 120 and 125 decrypts the encrypted group key to obtain the group key. Each of router nodes 120 and 125 also forwards the encrypted group key to corresponding nodes at an immediately lower hierarchical level (end devices 130, 135 and 136, and router node 135 of FIG. 1), which decrypt the group key. Thus, the group key is passed from each parent node to corresponding child nodes all the way down the hierarchy of wireless network 100 starting at the root (border router 110).

In an embodiment, border router 110 encrypts the group key using a pairwise transient key (PTK) which is used for encryption and decryption of unicast messages in wireless network 100. Thus, to obtain the group key, each of the nodes of wireless network 100 requires the PTK. The PTK may be derived based on a passphrase that each of the nodes of wireless network 100 must possess. Border router 110 is assumed to possess the passphrase, and the other nodes may obtain the passphrase from border router 110 using one of several known approaches. For example, a user may input (via a keypad, for example) the passphrase at each node. Another approach is to use the WPS (WiFi Protected Setup) procedure as described in Wi-Fi Protected Setup Specification, Version 1.0h, December.

When the WPS procedure is used, the root node (border router 110) operates as a WPS registrar, and provides the passphrase to the other nodes of wireless network 100. A node (assumed to be router node 120 in the following description), prior to 'joining' network 100, is placed within communication range of border router 110 (which may be placed in a secure location), and WPS push buttons are pressed at each router node 120 and border router 110.

The pressing of the WPS pushbuttons initiates the WPS procedures on border router 110 and the router node 120, which then exchange a sequence of eight messages (M1-M8) to perform WPS provisioning to cause the node to be enrolled with border router 110. The packets/messages (M1 through M8) exchanged during the WPS procedure are described in section 6.2. 'Registration Protocol Messages' of the above-referenced Wi-Fi Protected Setup Specification. During the exchange of messages M1-M8, border router 110 provides to router node 120 the Service Set Identifier (SSID, which is the same as the network ID of wireless network 100, as well as the passphrase from which to derive the PTK. In addition, border router 110 may also provide to router node 120 the channel number (frequency band in which to operate) as well as the time duration for which the group key and passphrase would be valid, after which interval border router node 120 may update the group key and passphrase, as described below.

Having thus obtained the passphrase, router node 120 is placed in its designated location of operation (here assumed to be within communication range of border router 110). Router node 120 thereafter participates in the formation of wireless network 100 according to the RPL protocol as described above. Alternatively, router node 120 may participate in formation of wireless network 100 first (and join network 100), and thereafter be provided the passphrase using WPS or other techniques.

Once router node 120 selects border router 110 as its parent node, router node 120 associates and authenticates with border router 110 through corresponding management frames as specified by the IEEE 802.11 standards. After the association and authentication (which may be open authentication) is completed, border router 110 initiates either a WPA (WiFi Protected Access) or WPA2 (WiFi Protected Access II) procedure to provide the PTK as well as the group key to router node 120. The PTK may be generated each time a node joins wireless network 100 via the WPA or WPA2 procedure. WPA and WPA2 are specified in the IEEE 802.11i-2004 standard.

When the WPA procedure is used (WPA uses Temporal Key Integrity Protocol or TKIP encryption), a 4-way handshake occurs between border router 110 and router node 120 to provide a pairwise transient key (PTK, used for encryption/decryption of unicast messages) to router node 120, followed by a 2-way handshake between border router 110 and router node 120 to provide the group key to router node 120. Each of the other nodes similarly obtains a PTK from its parent node via a 4-way handshake and the group key via a 2-way handshake.

When the WPA2 procedure is used (WPA2 uses Advanced Encryption Standard or AES encryption), a 4-way handshake occurs between a parent node and its child node to provide both the pairwise transient key (PTK, used for encryption/decryption of unicast messages) as well as the group key. The 4-way handshake of WPA2 is described in detail in the IEEE 802.11i-2004 standard, and is only briefly summarized herein with respect to FIG. 3, which illustrates a 4-way handshake between router node 120 and border router 110 according to WPA2.

Figure 3:
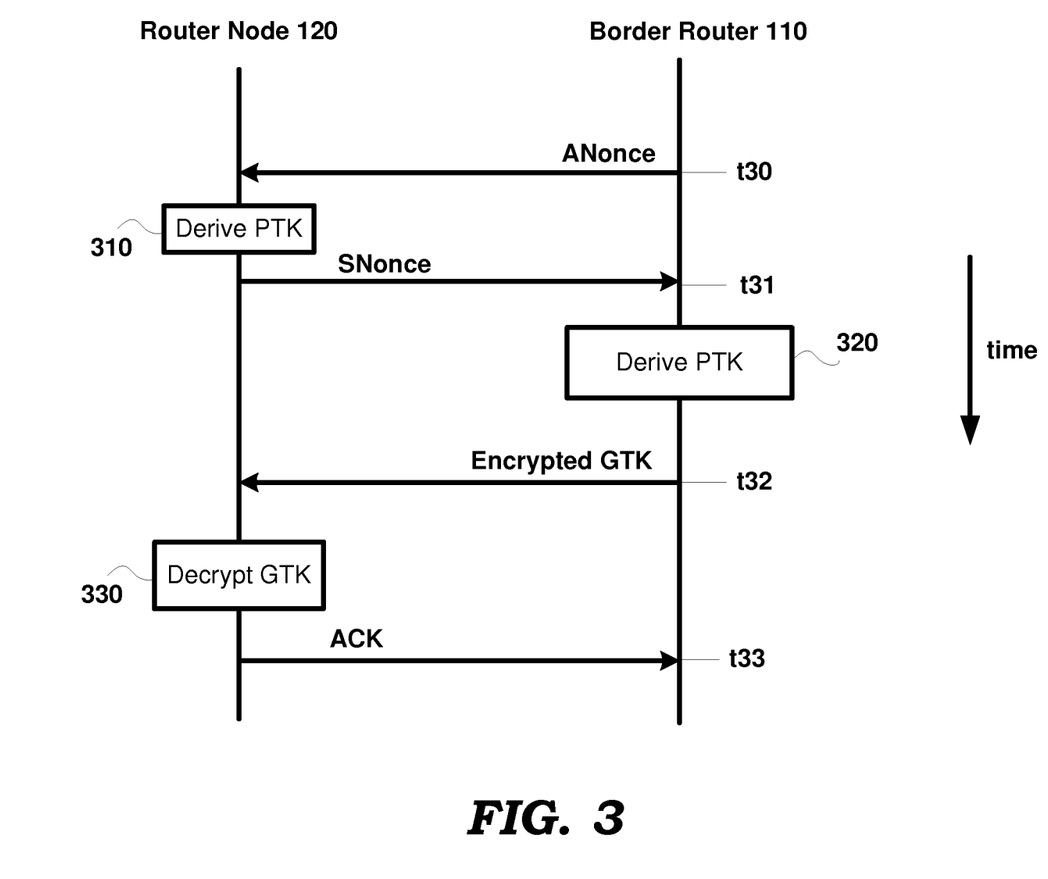
FIG. 3 is a diagram illustrating a 4-way handshake between a pair of nodes of a wireless network in an embodiment of the present disclosure.

Prior to the 4-way handshake according to WPA2, each of router node 120 and border router 110 is assumed to have derived a pre-shared key (PSK) based on the passphrase (provided to router node 120 by border router 110), and a pair-wise master key (PMK) based on the PSK, according to the WPA/WPA2 specifications. As shown in FIG. 3, at time instant t30, border router 110 transmits a random number (ANonce) to router node 120. Based on ANonce, another random number SNonce (internally generated), the PMK, and the MAC addresses of both router node 120 and border router 110, router node 120 generates (as indicated in box 310) a pair-wise transient key (PTK). Border router 110 and router node 120 may obtain each other's MAC addresses during the formation of wireless network 100, or by other known approaches.

At t31, router node 120 transmits SNonce to border router 110. Border router 110 then derives (box 320) the PTK (same as that generated by router node 110) based on ANonce, SNonce, the PMK and the MAC addresses of router node 120 and border router 110. The PTK is used for encryption and decryption of unicast messages exchanged between router node 120 and border router 110.

Border router 110 encrypts a group key (GTK or Group Temporal Key in IEEE 802.11 parlance) using the PTK, and transmits the encrypted group key to router node 120 at t32. The group key may have been generated earlier by border router 110 using a random number. However, if the group key has not yet been generated, then border router 110 may generate the group key also as part of the operations in box 320.

Border router 110 encrypts the GTK using the PTK, and transmits the encrypted GTK at t32. Router node 120 decrypts (as indicated in box 330) the received GTK using the PTK obtained earlier (box 210). At t33, router node 120 sends an acknowledgement to border router 110. At the end of the 4-way handshake, the PTK and group key are available at router 110.

Assuming the group key obtained by router node 110 (as described above) is current and valid, router node 125 obtains the same group key (and a corresponding different PTK) via a corresponding 4-way handshake with border router 110. If the group key has been changed by border router 110 by the time the 4-way handshake occurs between router node 125 and border router 110, router node 125 obtains the updated group key.

Each of the other nodes of FIG. 1 obtains the passphrase from border router 110 using WPS (similar to the manner described above with respect to router node 120) or other techniques. The nodes thereafter join wireless network 100, and obtain the currently valid group key (and a corresponding PTK) from the corresponding parent node using WPA or WPA2. Thus, for example, end devices 130 and 131 would each obtain the corresponding currently valid group key(s) and corresponding PTKs from router node 120 via WPA/WPA2. Similarly, router 135 and end device 136 would obtain the corresponding currently valid group key(s) and corresponding PTKs from router node 125, and end devices 140 and 145 would obtain the corresponding currently valid group key(s) and corresponding PTKs from router 135.

Thus, obtaining a group key for the very first time (on joining network 100) occurs via a 4-way handshake when WPA2 is used, and occurs via a 4-way handshake immediately followed by a 2-way handshake when WPA is used. Receipt of an updated (newly generated) group key occurs via a 2-way handshake as described below.

According to an aspect of the present disclosure, border router 110 updates (generates anew) both the group key as well as the passphrase at desired (regular or random) intervals. The updated group key and passphrase are then communicated to the other nodes of wireless network 100, from each parent to child (or children), as described next.

5. Updating of Group Key and Passphrase

Border router 110 updates the group key as well as the passphrase at regular or random intervals, each time using a corresponding random number to generate the new group key and the new passphrase. The updating of the group key and passphrase is designed with a view to preventing a 'guest' node that may have earlier (say 9 AM) been provided the (then valid) passphrase for temporary membership of wireless network 100 from having continued access to wireless network 100 (and thus to internet 190) even after the membership of the guest expires (say 2 PM same day), or the guest node 'leaves' wireless network 100.

In an embodiment, the new group key and passphrase are communicated from each parent node to its child nodes using a 2-way handshake procedure. The 2-way handshake procedure of the present disclosure is an enhancement (or modification) to the 2-way handshake (group key handshake) procedure of WPA2, which is described in detail in the IEEE 802.11i-2004 standard. While the 2-way handshake as defined by IEEE 802.11i-2004 is designed to communicate only the 'currently' valid group key to a STA from an AP, the modified/enhanced 2-way handshake of the present disclosure is used to transmit the new passphrase as well as the new group key from a parent node to a child node.

Figure 6:
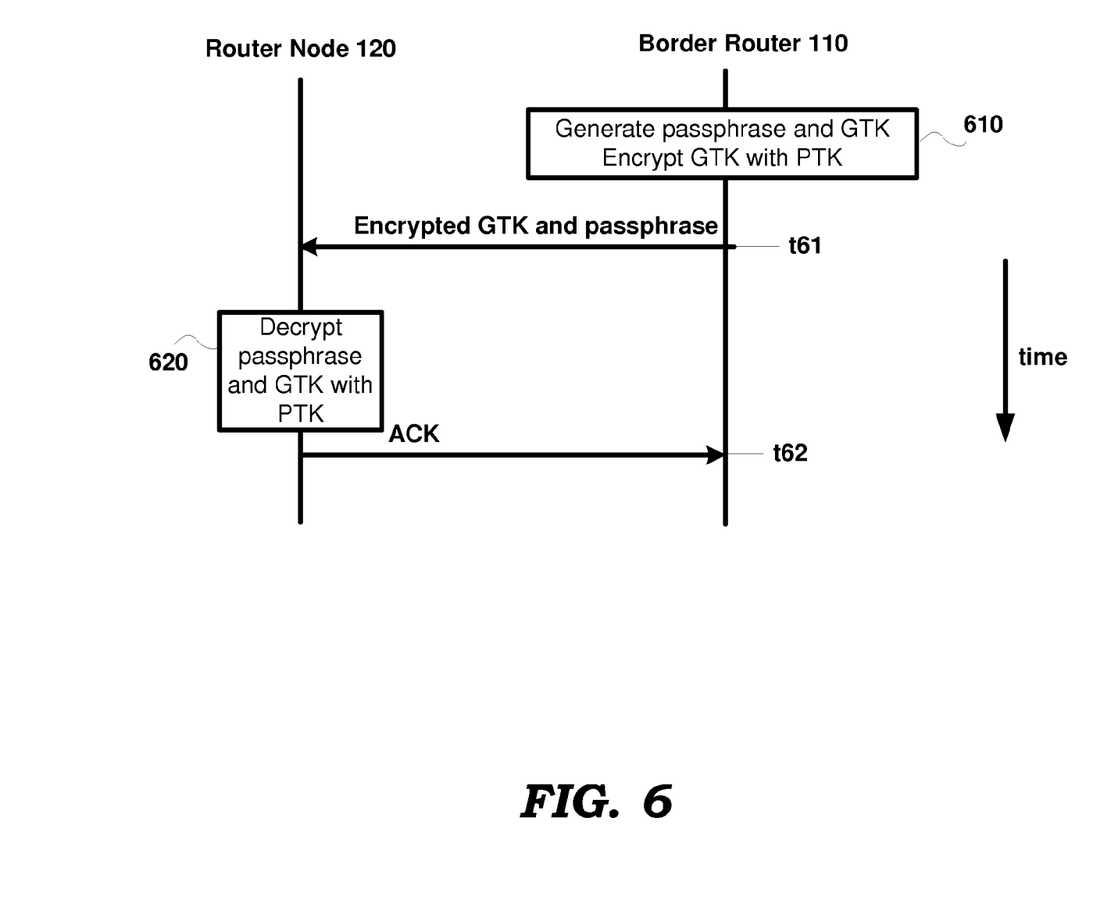
FIG. 6 is a diagram illustrating the manner in which updated group keys and passphrases are communicated from a parent node to a child node of a wireless network, in an embodiment of the present disclosure.

Thus, border router 110 communicates the updated (i.e., new values of) group key and the passphrase to its child nodes (router nodes 120 and 125 in the example of FIG. 1) using the modified/enhanced 2-way handshake. FIG. 6 illustrates a modified 2-way handshake between router node 120 and border router 110. Border router 110 initiates the 2-way handshake.

As depicted in box 610, border router generates a new group key (GTK) and a new passphrase, and encrypts each of the new GTK and new passphrase with the current PTK. The current PTK is available to each of border router 110 and router node 120 via WPA or WPA2 transactions in the manner described above. At time instant t61, border router 110 transmits the encrypted GTK and encrypted passphrase to router 110.

Router node 120 decrypts the encrypted new GTK and new passphrase using the PTK, as indicated by box 620. Router node 120 then transmits an acknowledgement (ACK) to border router 110 at t62.

In a manner similar to that depicted in FIG. 6, border router 110 transmits the new GTK and new passphrase to its other child node router node 125 as well. Each of the nodes of wireless network 100, after receipt of the new GTK and new passphrase from its parent, transmits the new GTK and new passphrase to each of its child nodes using corresponding modified 2-way handshake procedures, similar to that described above with respect to FIG. 6. Thus, all nodes of wireless network 100 obtain the new (updated) group key and new passphrase. A node of wireless network 100 may thereafter transmit, receive and process layer-2 packets with payload containing encrypted layer-3 packets with layer-3 multicast address as described above, using the new group key for encryption and decryption of the payload. The previous/old group key may be discarded by the nodes of wireless network 100.

Guest nodes that have disconnected from wireless network 100 may be prevented from rejoining wireless network with the passphrase earlier provided to the guest node, and therefore need to obtain (via the WPS mechanism noted above, for example) the latest passphrase to rejoin wireless network 100. Similarly, a node in wireless network 100 that gets disconnected from wireless network 100 (for example due to a discharged battery) may also need to obtain the latest passphrase once battery power is restored and the node tries to re-connect to wireless network 100, since the passphrase may have been updated in the interval that the node was down.

Although, border router 110 is noted as updating the group key and passphrase automatically (without external triggering or requests), border router 110 may also be triggered manually (by a user or administrator via an input device such as a keyboard at border router 110) to update the group key and the passphrase. Any of the nodes of wireless network 100 may also cause border router 110 to update the group key and passphrase, for example, via a mesh maintenance frame like DAO according to RPL, or a mesh management layer running on UDP/TCP (User Datagram Protocol/Transmission Control Protocol) to trigger the updating.

The implementation details of a wireless node of wireless network 100 in an embodiment are described next.

6. Wireless Node

Figure 7:
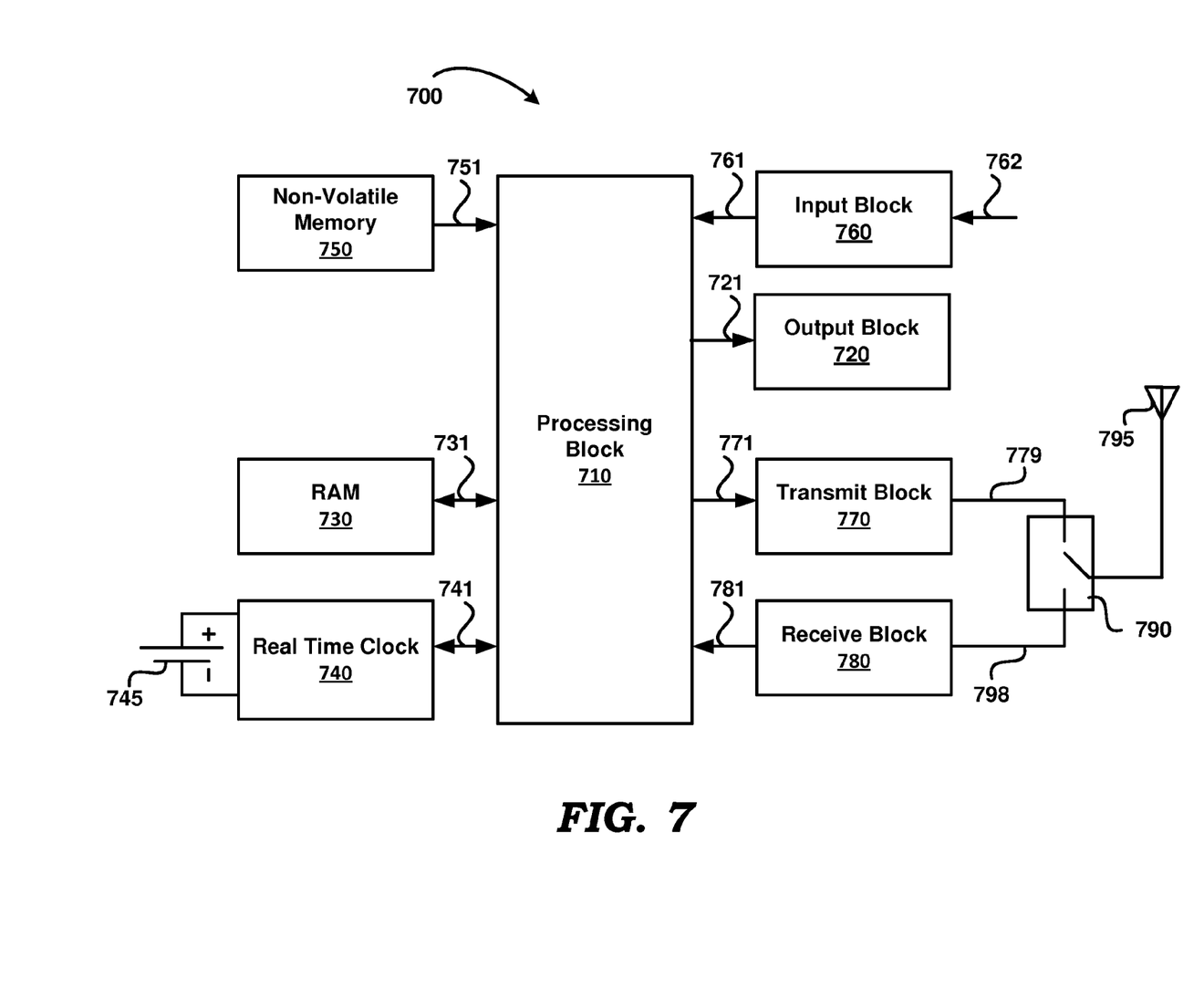
FIG. 7 is a block diagram showing the implementation details of a wireless device in an embodiment of the present disclosure.

FIG. 7 is a block diagram showing the implementation details of a wireless device in an embodiment of the present disclosure. Wireless device 700 may correspond to any of the nodes (router nodes, border router 110 and end devices) of wireless network 100 of FIG. 1. Wireless device 700 is shown containing processing block 710, output block 720, random access memory (RAM) 730, real-time clock (RTC) 740, battery 745, non-volatile memory 750, input block 760, transmit block 770, receive block 780, switch 790 and antenna 795. The whole of wireless device 700 may be implemented as a system-on-chip (SoC), except for battery 745 and antenna 795. Alternatively, the blocks of FIG. 7 may be implemented on separate integrated circuits (IC).

The components/blocks of wireless device 700 are shown merely by way of illustration, and wireless device 700 may contain more or fewer components/blocks than shown in FIG. 7. Further, although not shown in FIG. 7, all blocks of wireless device 700 may be connected automatically to an auxiliary power source (such as battery 745) in the event of failure of main power source (not shown).

Antenna 795 operates to receive from, and transmit to, a wireless medium, corresponding data packets. Switch 790 may be controlled by processing block 710 (connection not shown) to connect antenna 795 either to receive block 780 via path 798, or to transmit block 770 via path 779, depending on whether wireless device 700 is to receive or transmit. When wireless device 700 corresponds to border router 110, antenna 795 corresponds to antenna 115 of FIG. 1.

Transmit block 770 receives data to be transmitted on path 771 from processing block 710, modulates a radio frequency (RF) signal according to IEEE 802.11 standards, and transmits the modulated RF signal via switch 790 and antenna 795. Receive block 780 receives an RF signal bearing data via switch 790, path 798 and antenna 795, demodulates the RF signal, and provides the extracted data to processing block 710 on path 781.

RTC 740 operates as a clock, and provides the 'current' time to processing block 710 on path 741. RTC 740 may be backed-up by battery 745 (in addition to the normal source of power, not shown in the Figure). RTC 740 may also contain a trickle timer. RTC 740 may also contain memory to store critical information received from processing block 710. Although not shown as such in FIG. 7, battery 745 may also be used as back-up power to one or more of the other components/blocks of wireless device 700. Thus, for example, the power supply to flash memory 720 may be automatically switched (by corresponding circuitry not shown) to battery 745 in case of failure of the main power source (not shown).

Non-volatile memory 750 is a non-transitory machine readable medium, and stores instructions, which when executed by processing block 710, causes wireless device 700 to operate as described above (including the layers of FIG. 4 and exchange of packets). The instructions include those that enable wireless device 700 to operate in accordance with the steps of the flowchart of FIG. 2.

Processing block 710 (or processor in general) may contain multiple processing units internally, with each processing unit potentially being designed for a specific task. Alternatively, processing block 710 may contain only a single general-purpose processing unit. Processing block 710 may execute instructions stored in non-volatile memory 750 or RAM 730 to enable wireless node 700 to operate according to several aspects of the present disclosure, described above in detail.

RAM 730 is a volatile random access memory, and may be used for storing instructions and data. Routing tables maintained by wireless device 700 may be stored in RAM 730.

RAM 730 and non-volatile memory 750 (which may be implemented in the form of read-only memory/ROM/Flash) constitute computer program products or machine (or computer) readable medium, which are means for providing instructions to processing block 710. Thus, such medium can be in the form of removable (floppy, CDs, tape, etc.) or non-removable (hard drive, etc.) medium. Processing block 710 may retrieve the instructions (via corresponding paths 751 and 731), and execute the instructions to provide several features of the present disclosure described above (including the flow-chart of FIG. 2, communications stack, distribution of group keys, etc.).

The term "storage media/medium" as used herein refers to any non-transitory media that store data and/or instructions that cause a machine to operate in a specific fashion. Such storage media may comprise non-volatile media and/or volatile media. Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of operating a router node of a wireless network, wherein said method is performed in said router node, said router node having a plurality of neighbor nodes in said wireless network, said method comprising:

maintaining a single counter to represent a number of data packets transmitted thus far by said router node to said plurality of neighbor nodes, wherein said single counter is incremented upon transmission of a corresponding data packet to any of said plurality of neighbor nodes;

receiving a group key from a parent node of said router node, wherein said parent node is comprised in said wireless network;

forwarding said group key to a child node of said router node, wherein said child node is comprised in said wireless network;

receiving a sequence of data packets for forwarding to respective destination nodes; and forwarding each data packet to at least one of said plurality of neighbor nodes, wherein each forwarded data packet contains a count value in a layer-2 header, wherein said count value represents the value in said single counter, wherein the count value in each of said sequence of data packets is a unique value representing the number of data packets transmitted thus far by said router node, wherein said sequence of data packets contain a set of multicast data packets and a set of unicast data packets, wherein said single counter is incremented upon transmission of each of said sequence of data packets, including said set of multicast packets and said set of unicast data packets, wherein said group key is used to encrypt the payload portion of the corresponding multicast data packet, wherein each forwarded multicast data packet contains an encrypted payload portion, and said count value in said layer-2 header of the multicast data packet.

2. The method of claim 1, wherein the payload of each of said set of multicast data packets is encrypted using said count value for the corresponding data packet and also said group key.

3. The method of claim 2, wherein said wireless network comprises a border router and a plurality of router nodes according to a layer-3 protocol, said plurality of router nodes including said router node and said neighbor nodes, wherein a same group key is used by all of said plurality of router nodes in said wireless network, said group key being said same group key.

4. The method of claim 3, further comprising:
receiving a layer-2 multicast packet with an encrypted payload, said payload containing a layer-3 packet specifying a multicast address;

decrypting said payload using said group key; and determining if at least one child node of said router node belongs to a group corresponding to said multicast address, wherein said encrypted payload is forwarded as a second layer-2 multicast packet to corresponding child nodes of said wireless network as said plurality of neighbor nodes if said determining determines that at least one child node belongs to said group, wherein said child node is comprised in said at least one child node.

5. The method of claim 4, wherein said parent node is one of said border router and said plurality of router nodes, wherein said same group key is used by said parent node and said child node also to decrypt said payload of the corresponding layer-2 multicast packet.

6. The method of claim 5, wherein said wireless network is according to a hierarchy in which said border router is as a root at the highest level of said hierarchy, wherein said group key is generated by said border router and sent to nodes at an immediately lower level, and wherein nodes at each level forward said group key to the corresponding immediately lower level until said group key is received by all end nodes of said wireless network.

7. The method of claim 6, wherein said border router generates a corresponding new group key at a later time instant and forwards the corresponding new group key to nodes at an immediately lower level such that the corresponding new group key is thereafter operative as said same group key in all of said plurality of router nodes after said later time instance, wherein said border router also generates a corresponding passphrase along with said corresponding new group key, wherein both of said corresponding new group key and said corresponding passphrase are forwarded by said border router to nodes at said immediately lower level, wherein said wireless network is designed to operate according to one of IEEE 802.11 and IEEE 802.15.4 standards.

8. The method of claim 5, wherein said layer-2 multicast packet is received from said parent node, said layer-2 multicast packet comprising a count field containing a second count value in a layer-2 header, wherein said decrypting decrypts said payload using said second count value as well as said group key, wherein said second count value represents a count of the number of packets, including said layer-2 multicast packet, that have been transmitted by said parent node, wherein said second count value is replaced by said value in said count field before being forwarded by said forwarding.

9. The method of claim 8, wherein said decrypting, said determining and said forwarding are performed only if said second count value is greater than a local count value maintained by said router node, said local count value representing the total number of packets received by said router node from said parent node.

10. A non-transitory machine readable medium storing one or more sequences of instructions for operating a router node of a wireless network, said router node having a plurality of neighbor nodes in said wireless network, wherein execution of said one or more instructions by one or more processors contained in said router node enables said router node to perform the actions of:

maintaining a single counter to represent a number of data packets transmitted thus far by said router node to said plurality of neighbor nodes, wherein said single counter is incremented upon transmission of a corresponding data packet to any of said plurality of neighbor nodes;

receiving a group key from a parent node of said router node, wherein said parent node is comprised in said wireless network;

forwarding said group key to a child node of said router node, wherein said child node is comprised in said wireless network;

receiving a sequence of data packets for forwarding to respective destination nodes; and forwarding each data packet to at least one of said plurality of neighbor nodes, wherein each forwarded data packet contains a count value in a layer-2 header, wherein said count value represents the value in said single counter, wherein the count value in each of said sequence of data packets is a unique value representing the number of data packets transmitted thus far by said router node, wherein said sequence of data packets contain a set of multicast data packets and a set of unicast data packets, wherein said single counter is incremented upon transmission of each of said sequence of data packets, including said set of multicast packets and said set of unicast data packets, wherein said group key is used to encrypt the payload portion of the corresponding multicast data packet, wherein each forwarded multicast data packet contains an encrypted payload portion, and said count value in said layer-2 header of the multicast data packet.

11. The non-transitory machine readable medium of claim 10, wherein the payload of each of said set of multicast data packets is encrypted using said count value for the corresponding data packet and also said group key.

12. The non-transitory machine readable medium of claim 11, wherein said wireless network comprises a border router and a plurality of router nodes according to a layer-3 protocol, said plurality of router nodes including said router node and said neighbor nodes, wherein a same group key is used by all of said plurality of router nodes in said wireless network, said group key being said same group key.

13. The non-transitory machine readable medium of claim 12, further comprising instructions for enabling said router node to perform the actions of:

receiving a layer-2 multicast packet with an encrypted payload, said payload containing a layer-3 packet specifying a multicast address;

decrypting said payload using said group key; and determining if at least one child node of said router node belongs to a group corresponding to said multicast address, wherein said encrypted payload is forwarded as a second layer-2 multicast packet to corresponding child nodes of said wireless network as said plurality of neighbor nodes if said determining determines that at least one child node belongs to said group, wherein said child node is comprised in said at least one child node.

14. The non-transitory machine readable medium of claim 13, wherein said wireless network is according to a hierarchy in which said border router is as a root at the highest level of said hierarchy, wherein said group key is generated by said border router and sent to nodes at an immediately lower level, and wherein nodes at each level forward said group key to the corresponding immediately lower level until said group key is received by all end nodes of said wireless network.

15. The non-transitory machine readable medium of claim 14, wherein said border router generates a corresponding new group key at a later time instant and forwards the corresponding new group key to nodes at an immediately lower level such that the corresponding new group key is thereafter operative as said same group key in all of said plurality of router nodes after said later time instance.

16. A router node of a wireless network, said router node having a plurality of neighbor nodes in said wireless network, said router node comprising:

a memory and a processor, said memory to store instructions, said processor to execute instructions stored in said memory causing said router node to perform the actions of:

maintaining a single counter to represent a number of data packets transmitted thus far by said router node to said plurality of neighbor nodes, wherein said single counter is incremented upon transmission of a corresponding data packet to any of said plurality of neighbor nodes;

receiving a sequence of data packets for forwarding to respective destination nodes; and forwarding each data packet to at least one of said plurality of neighbor nodes, wherein each forwarded data packet contains a count value in a layer-2 header of the packet, wherein said count value represents the value in said single counter, wherein the count value in each of said sequence of data packets is a unique value representing the number of data packets transmitted thus far by said router node, wherein said sequence of data packets contain a set of multicast data packets and a set of unicast data packets, wherein said single counter is incremented upon transmission of each of said sequence of data packets, including said set of multicast packets and said set of unicast data packets, wherein said count value is used to encrypt the payload portion of the corresponding multicast data packet, wherein each forwarded multicast data packet contains an encrypted payload portion, and said count value in said layer-2 header of the multicast data packet.

17. The router node of claim 16, further comprising:

receiving a group key from a parent node of said router node, wherein said parent node is comprised in said wireless network;

forwarding said group key to a child node of said router node, wherein said child node is comprised in said wireless network, wherein the payload of each of said set of multicast data packets is encrypted using said count value for the corresponding data packet and also said group key.

18. The router node of claim 17, wherein said wireless network comprises a border router and a plurality of router nodes according to a layer-3 protocol, said plurality of router nodes including said router node and said neighbor nodes, wherein a same group key is used by all of said plurality of router nodes in said wireless network, said group key being said same group key.

19. The router node of claim 18, said actions further comprising:

receiving a layer-2 multicast packet with an encrypted payload, said payload containing a layer-3 packet specifying a multicast address;

decrypting said payload using said group key; and determining if at least one child node of said router node belongs to a group corresponding to said multicast address, wherein said encrypted payload is forwarded as a second layer-2 multicast packet to corresponding child nodes of said wireless network as said plurality of neighbor nodes if said determining determines that at least one child node belongs to said group, wherein said child node is comprised in said at least one child node.

20. The router node of claim 19, wherein said layer-2 multicast packet is received from said parent node, said layer-2 multicast packet comprising a count field containing a second count value in a layer-2 header, wherein said decrypting decrypts said payload using said second count value as well as said group key, wherein said second count value represents a count of the number of packets, including said layer-2 multicast packet, that have been transmitted by said parent node, wherein said second count value is replaced by said value in said count field before being forwarded by said forwarding, wherein said decrypting, said determining and said forwarding are performed only if said second count value is greater than a local count value maintained by said router node, said local count value representing the total number of packets received by said router node from said parent node.

* * * * *